United States Patent
Takahashi et al.

(10) Patent No.: US 12,461,569 B2
(45) Date of Patent: Nov. 4, 2025

(54) ELECTRONIC APPARATUS

(71) Applicant: Lenovo (Singapore) Pte. Ltd., Singapore (SG)

(72) Inventors: Daisuke Takahashi, Kanagawa (JP); Takehito Yamauchi, Kanagawa (JP); Hiroaki Kinoshita, Kanagawa (JP); Takayuki Morino, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 346 days.

(21) Appl. No.: 18/169,677

(22) Filed: Feb. 15, 2023

(65) Prior Publication Data
US 2023/0288967 A1    Sep. 14, 2023

(30) Foreign Application Priority Data
Mar. 10, 2022  (JP) ................................ 2022-037121

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)
(58) Field of Classification Search
CPC .... G06F 1/1616; G06F 1/1652; G06F 1/1681; H04M 1/022
See application file for complete search history.

(56) References Cited

U.S. PATENT DOCUMENTS

| | | | | |
|---|---|---|---|---|
| 8,971,031 | B2* | 3/2015 | Mok | G06F 1/1656 361/679.27 |
| 9,348,450 | B1 | 5/2016 | Kim | |
| 9,557,771 | B2* | 1/2017 | Park | H04M 1/0237 |
| 10,551,880 | B1* | 2/2020 | Ai | G06F 1/1641 |

(Continued)

FOREIGN PATENT DOCUMENTS

| | | |
|---|---|---|
| EP | 3783872 A1 | 2/2021 |
| JP | 2020522730 A | 7/2020 |

(Continued)

OTHER PUBLICATIONS

Office Action issued in corresponding Japanese Patent Application No. 2022-037121, dated Apr. 25, 2023 (3 pages).

(Continued)

*Primary Examiner* — Anthony Q Edwards
(74) *Attorney, Agent, or Firm* — Osha Bergman Watanabe & Burton LLP

(57) ABSTRACT

An electronic apparatus includes: a first chassis member that has a first edge portion; a second chassis member that has a second edge portion adjacent to the first edge portion, and is adjacent to the first chassis member; a hinge device that connects the first chassis member and the second chassis member so as to be relatively rotatable between a first posture in which the first chassis member and the second chassis member are laminated so as to overlap each other in a surface normal direction and a second posture in which the first chassis member and the second chassis member are aligned in a direction perpendicular to the surface normal direction; and a cover component that is disposed so as to straddle the first edge portion and the second edge portion.

6 Claims, 7 Drawing Sheets

(56) References Cited

U.S. PATENT DOCUMENTS

| | | | |
|---|---|---|---|
| 10,928,860 B2 * | 2/2021 | Park | G06F 1/1681 |
| 2020/0382627 A1 * | 12/2020 | Park | H04M 1/0216 |
| 2021/0227709 A1 * | 7/2021 | Sim | G06F 1/1652 |
| 2023/0297133 A1 * | 9/2023 | Lee | G06F 1/1683 |
| | | | 361/679.02 |

FOREIGN PATENT DOCUMENTS

| | | | |
|---|---|---|---|
| JP | 2021015492 A | 2/2021 | |
| JP | 6952833 B1 | 10/2021 | |
| WO | 2018213687 A2 | 11/2018 | |
| WO | 2021224991 A1 | 11/2021 | |

OTHER PUBLICATIONS

Extended European Search Report issued in corresponding European Application No. 23158118.2 mailed Jul. 28, 2023 (8 pages).

* cited by examiner

ELECTRONIC APPARATUS

CROSS-REFERENCE TO RELATED APPLICATIONS

This application claims priority to Japanese Patent Application No. 2022-37121 filed on Mar. 10, 2022, the contents of which are hereby incorporated herein by reference in their entirety.

TECHNICAL FIELD

The present invention relates to an electronic apparatus in which adjacent chassis members are connected so as to be relatively rotatable.

BACKGROUND

The present applicant has proposed an electronic apparatus configured so that not only a chassis but also a display can be folded by using a flexible display such as organic Electro Luminescence (EL) (see, for example, Japanese Patent Publication No. 6952833).

In the electronic apparatus as described above, it is necessary to prevent interference between left and right chassis members that rotate relatively. For this reason, the respective chassis members are provided with relief shapes at edge portions adjacent to each other so as to prevent interference from each other. However, the relief shapes create a large gap between front surfaces of the respective chassis members when the chassis members are aligned in a flat plate shape. Therefore, a configuration in Japanese Patent Publication No. 6952833 employs a configuration in which the gap is filled with cover components attached to side end portions of a hinge device.

However, since the cover component as described above relatively moves with respect to each of the chassis members, it is necessary to secure a small gap with each of the chassis members. However, since the gap is enlarged when the chassis members performs rotational movement, it has been found that there is a concern that foreign matter may enter an inside of a chassis from the gap.

SUMMARY

One or more embodiments of the present invention provide an electronic apparatus capable of suppressing entry of foreign matter from the gap between chassis members that are relatively rotatably connected.

An electronic apparatus according to one or more embodiments of the present invention includes a first chassis member that has a first edge portion; a second chassis member that has a second edge portion adjacent to the first edge portion, and is adjacent to the first chassis member; a hinge device that connects the first chassis member and the second chassis member so as to be relatively rotatable between a first posture in which the first chassis member and the second chassis member are laminated so as to overlap each other in a surface normal direction and a second posture in which the first chassis member and the second chassis member are aligned in a direction perpendicular to the surface normal direction; a cover component that is disposed so as to straddle the first edge portion and the second edge portion, and disposed so as to fill a gap formed between front surfaces of the first chassis member and the second chassis member in a case of the second posture; a first gap cover that is interposed in a first gap formed between the cover component and the first chassis member; and a second gap cover that is interposed in a second gap formed between the cover component and the second chassis member.

An electronic apparatus according to one or more embodiments of the present invention includes a first chassis member that has a first edge portion; a second chassis member that has a second edge portion adjacent to the first edge portion, and is adjacent to the first chassis member; a hinge device that connects the first chassis member and the second chassis member so as to be relatively rotatable between a first posture in which the first chassis member and the second chassis member are laminated so as to overlap each other in a surface normal direction and a second posture in which the first chassis member and the second chassis member are aligned in a direction perpendicular to the surface normal direction; a cover component that is disposed so as to straddle the first edge portion and the second edge portion, and disposed so as to fill a gap formed between front surfaces of the first chassis member and the second chassis member in a case of the second posture; a first magnet that is fixed to the first chassis member and faces a first gap formed between the cover component and the first chassis member; and a second magnet that is fixed to the second chassis member and faces a second gap formed between the cover component and the second chassis member.

The above-described embodiments of the present invention can suppress the entry of foreign matter from the gap between the chassis members connected so as to be relatively rotatable.

DETAILED DESCRIPTION

An electronic apparatus according to the present invention will be described in detail below with reference to the accompanying drawings.

Figure 1:
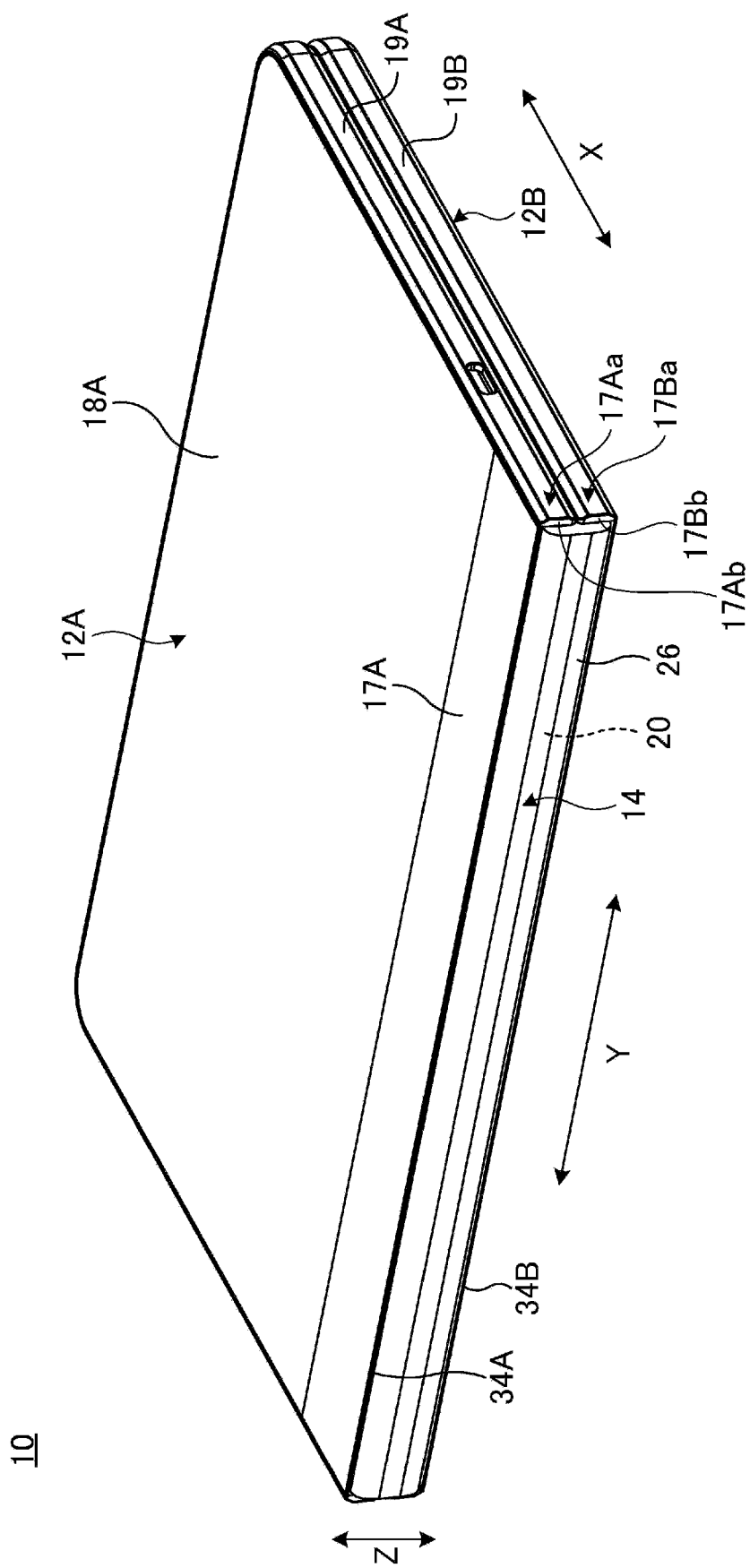
FIG. 1 is a perspective view schematically illustrating a state in which an electronic apparatus according to one or more embodiments is closed and in a 0-degree posture.
Figure 2:
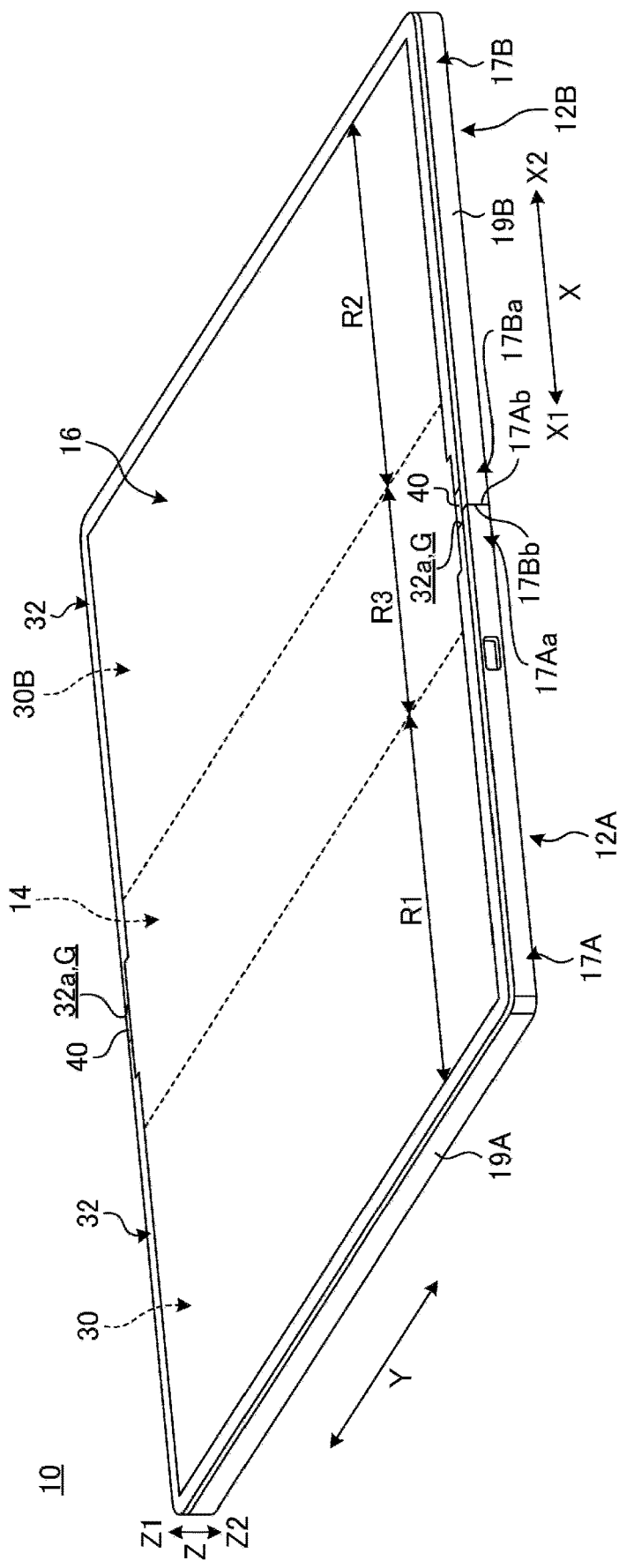
FIG. 2 is a perspective view schematically illustrating a state in which the electronic apparatus illustrated in FIG. 1 is opened and in a 180-degree posture.
Figure 3:
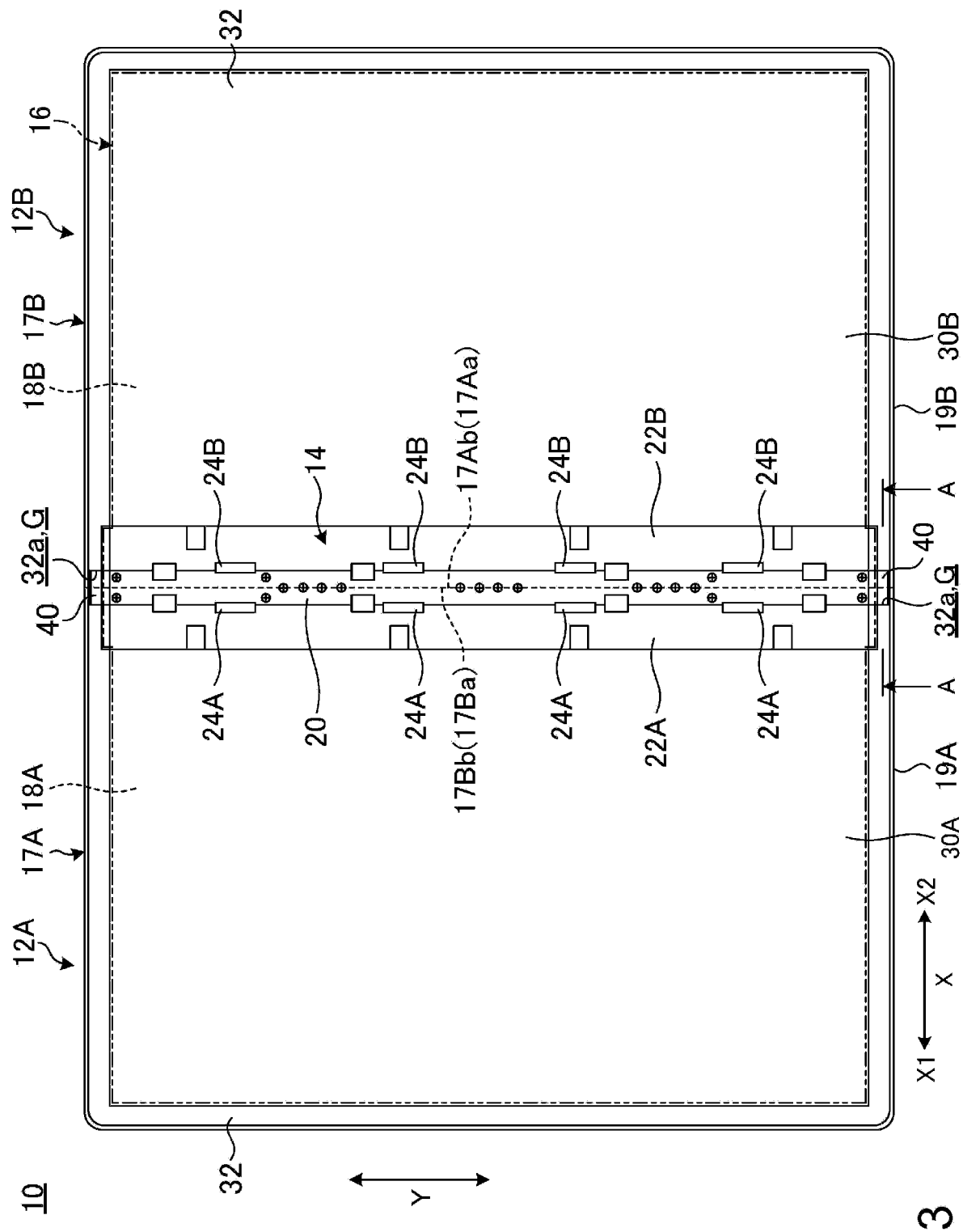
FIG. 3 is a plan view schematically illustrating an internal structure of the electronic apparatus illustrated in FIG. 2.

FIG. 1 is a perspective view schematically illustrating a state in which an electronic apparatus 10 according to one or more embodiments is closed and in a 0-degree posture. FIG. 2 is a perspective view schematically illustrating a state in which the electronic apparatus 10 illustrated in FIG. 1 is opened and in a 180-degree posture. FIG. 3 is a plan view schematically illustrating an internal structure of the electronic apparatus 10 illustrated in FIG. 2.

As illustrated in FIGS. 1 to 3, the electronic apparatus 10 includes a first chassis 12A, a second chassis 12B, a hinge device 14, and a display 16. The electronic apparatus 10 of one or more embodiments exemplifies a tablet PC or a notebook PC that is capable of being folded like a book. The electronic apparatus 10 may be a smartphone, a portable game machine, or the like.

Each of the chassis 12A and 12B is disposed adjacent to each other. The first chassis 12A includes a first chassis member 17A and a first rear surface plate 18A. The first chassis member 17A is a rectangular frame-shaped member having side walls 19A standing upright on three sides other than the first edge portion 17Aa adjacent to the second chassis 12B. The first rear surface plate 18A is a plate-shaped member that closes a rear surface opening of the first chassis member 17A (see also FIG. 4). Similarly, the second chassis 12B includes a second chassis member 17B that has side walls 19B that stand upright on three sides other than the second edge portion 17Ba adjacent to the first chassis 12A, and a second rear surface plate 18B that closes a rear surface opening of the second chassis member 17B. The front surface openings of the chassis members 17A and 17B are closed with the display 16.

Each of the members 17A, 17B, 18A and 18B is made of, for example, a metal member such as stainless steel, magnesium, or aluminum, or a fiber-reinforced resin plate containing reinforcing fibers such as carbon fiber, and the like.

The hinge device 14 connects the chassis members 17A and 17B so as to be relatively rotatable. The hinge device 14 also functions as a rear cover that hides the gap between the edge portions 17Aa and 17Ba formed in the 0-degree posture illustrated in FIG. 1. The display 16 extends over the chassis members 17A and 17B.

Hereinafter, as for the electronic apparatus 10, description is performed while the direction in which the chassis 12A and 12B are arranged is called an X direction, the direction along the edge portions 17Aa and 17Ba orthogonal to the X direction is called a Y direction, and the thickness direction of the chassis 12A and 12B is called a Z direction. As for the X direction, the direction from the second chassis 12B to the first chassis 12A may be called an X1 direction, and a direction opposite to the X1 direction may be called an X2 direction. As for the Z direction, the direction from the rear surface to the front surface of each of the chassis 12A and 12B, that is, the direction from the inner surfaces of bottom plates 34A and 34B, which will be described later, toward the display 16 is called a Z1 direction, and a direction opposite to the Z1 direction is called a Z2 direction. As for the angular posture between the chassis 12A and 12B, description is performed while a state in which the chassis 12A and 12B are folded so as to overlap each other in the surface normal direction is called the 0-degree posture (see FIG. 1), and a state in which the chassis 12A and 12B are aligned in a direction perpendicular to the surface normal direction (X direction) is called the 180-degree posture (see FIG. 2). It is possible to call the posture between 0 and 180 degrees by appropriately carving the angle. For example, a state in which the surface normal directions of the chassis 12A and 12B are orthogonal to each other is a 90-degree posture. These angles are for convenience of description, and the actual product may of course have angular positions slightly deviated from the exact angular positions indicated by angle numbers.

As illustrated in FIG. 3, the hinge device 14 of one or more embodiments has a hinge main body 20, support plates 22A and 22B, and a plurality of link arms 24A and 24B.

The hinge main body 20 is provided at a position straddling the edge portions 17Aa and 17Ba of the chassis 12A and 12B, and extends over the substantially entire length in the Y direction along the edge portions 17Aa and 17Ba. The hinge main body 20 is a block-shaped component formed of a metal material such as aluminum. The hinge main body 20 supports two hinge shafts aligned in the X direction in the 180-degree posture. A plurality of link arms 24A aligned in the Y direction are supported on one hinge shaft, and a plurality of link arms 24B aligned in the Y direction are supported on the other hinge shaft. Each link arm 24A is pivotally supported by a bracket fixed to the first chassis member 17A. Each link arm 24B is pivotally supported by a bracket fixed to the second chassis member 17B.

Thereby, the hinge main body 20 connects the chassis 12A and 12B so as to be relatively rotatable. A gear mechanism for synchronizing rotational movement between the chassis 12A and 12B and a torque mechanism for applying a predetermined rotational torque to the rotational movement between the chassis 12A and 12B are also provided inside the hinge main body 20. A rear cover component 26 serving as a decorative cover is attached to an outer surface of the hinge main body 20 (see FIG. 1).

The support plates 22A and 22B are plates that are formed of a metal material such as aluminum, extend in the Y direction, and have bilaterally symmetrical shapes. The support plates 22A and 22B are pivotally supported with respect to brackets, on which the link arms 24A are 24B are pivotally supported, thereby being swingable. The support plates 22A and 22B are disposed on the left and right sides of the hinge main body 20 in the 180-degree posture, and their front surfaces are disposed on the same plane as the front surface of the hinge main body 20. As a result, the hinge device 14 is capable of supporting a folding region R3 (see FIG. 2) of the display 16, which will be described later, in the 180-degree posture.

As illustrated in FIGS. 1 to 3, the display 16 is formed in a flexible sheet shape. The display 16 is, for example, an Organic Electro Luminescence Diode (OLED).

In the 0-degree posture illustrated in FIG. 1, the chassis 12A and 12B are in a state of being folded in half and laminated on each other. At this time, the display 16 is in a state in which a first region R1 on a side of the first chassis 12A and a second region R2 on a side of the second chassis 12B are disposed so as to face each other, and a folding region R3 that is a boundary region between the regions R1 and R2 is folded in an arc shape. In the 180-degree posture illustrated in FIG. 2, the chassis 12A and 12B are disposed side by side with each other left and right. At this time, the display 16 has the regions R1 and R2 and the folding region R3 disposed side by side on a XY plane, and forms a flat plate shape as a whole.

As illustrated in FIGS. 2 and 3, the display 16 may be supported by the first plate 30A, the second plate 30B, and the hinge device 14. The plates 30A and 30B have a configuration in which a metal frame made of a magnesium alloy is attached to an outer periphery of the rear surface of a carbon fiber reinforced resin plate in which carbon fibers are impregnated with a matrix resin such as epoxy resin.

The plates 30A and 30B are disposed on the left and right so as to provide a gap while interposing the hinge device 14 therebetween, and support a rear surface of the display 16 on respective front surfaces of the plates 30A and 30B. In the display 16, a rear surface of the first region R1 is adhesively fixed to the front surface of the first plate 30A, and a rear surface of the second region R2 is adhesively fixed to the front surface of the second plate 30B. The first plate 30A is fastened to the first chassis member 17A. The second plate 30B is fastened to the second chassis member 17B.

In the 180-degree posture illustrated in FIG. 3, in the hinge device 14, the hinge main body 20 and the front surfaces of the left and right support plates 22A and 22B between the plates 30A and 30B are disposed on the same plane as the front surfaces of the plates 30A and 30B. As a result, the hinge device 14 supports the rear surface of the folding region R3 of the display 16. The folding region R3 is supported so as to be relatively movable with respect to the hinge device 14, thereby being folded and gradually to transform into an arc shape when rotational movement is performed from the 180-degree posture to the 0-degree posture.

As illustrated in FIGS. 2 and 3, the electronic apparatus 10 of one or more embodiments includes a bezel member 32 that surrounds an outer periphery of the front surface of the display 16. The bezel member 32 is provided so as to straddle between the side walls 19A and 19B standing upright on the sides of the display 16 and the front surface of the display 16, and covers and hides the gap therebetween. The bezel member 32 is fixed to front surfaces 19Aa and 19Ba of the side walls 19A and 19B (see FIGS. 4 and 5A) and the front surface of the display 16 with an adhesive material such as double-sided tape.

The bezel member 32 of one or more embodiments has a pair of dividing portions 32a and 32a at positions passing through the sides of the hinge main body 20 at the center in the X direction. For this reason, the bezel member 32 is actually configured by two U-shaped members having a substantially right-angled corner, and surrounds most of the outer periphery of the display 16.

By the way, the left and right chassis 12A and 12B rotate relatively. For this reason, it is necessary to prevent the edge portions 17Aa and 17Ba of the chassis 12A and 12B from interfering with each other within the rotation range from the 0-degree posture to the 180-degree posture. Therefore, the electronic apparatus 10 of one or more embodiments has relief shapes at the edge portions 17Aa and 17Ba of the chassis 12A and 12B.

Figure 4:
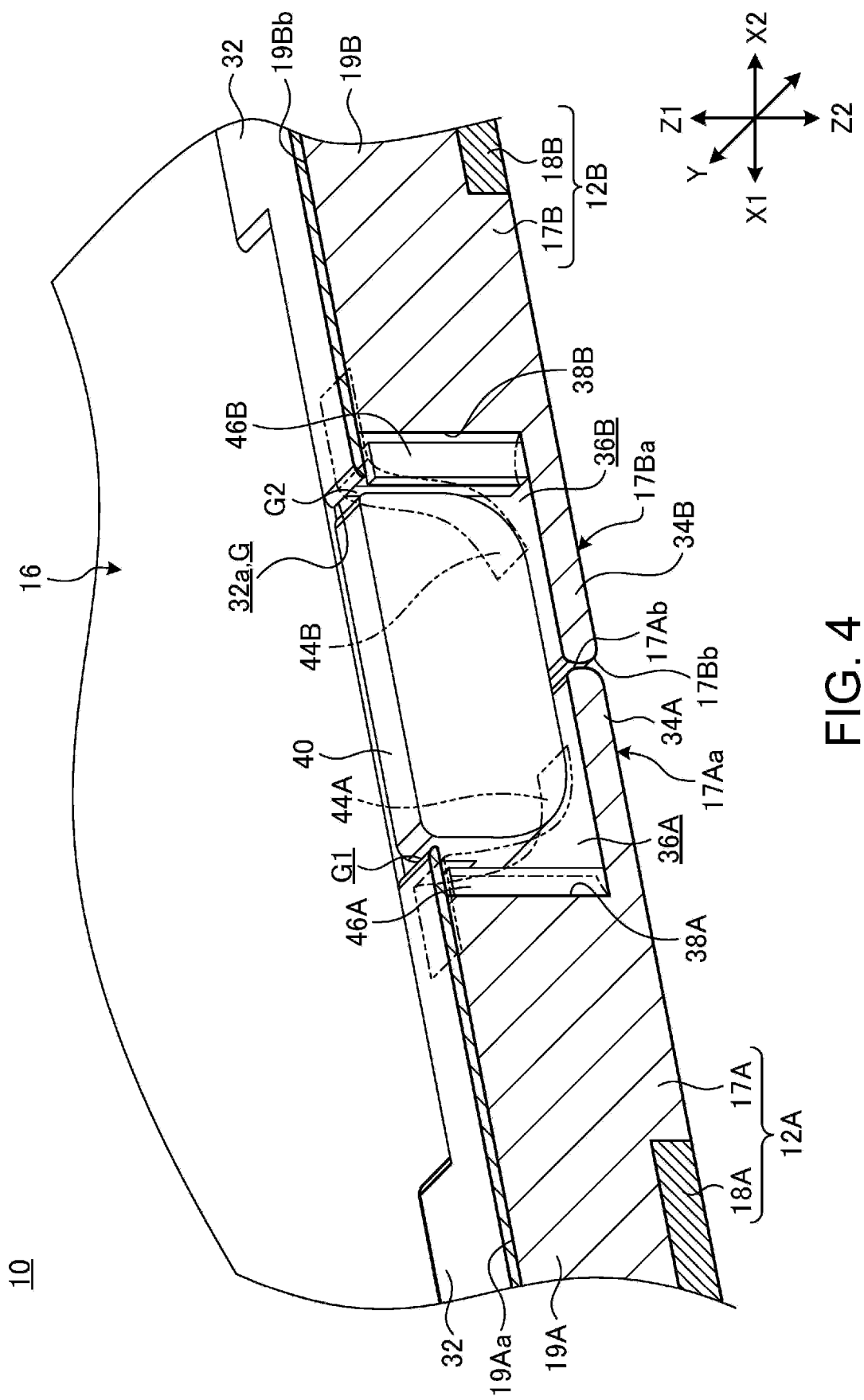
FIG. 4 is a schematic cross-sectional perspective view along line A-A in FIG. 3.
Figure 5A:
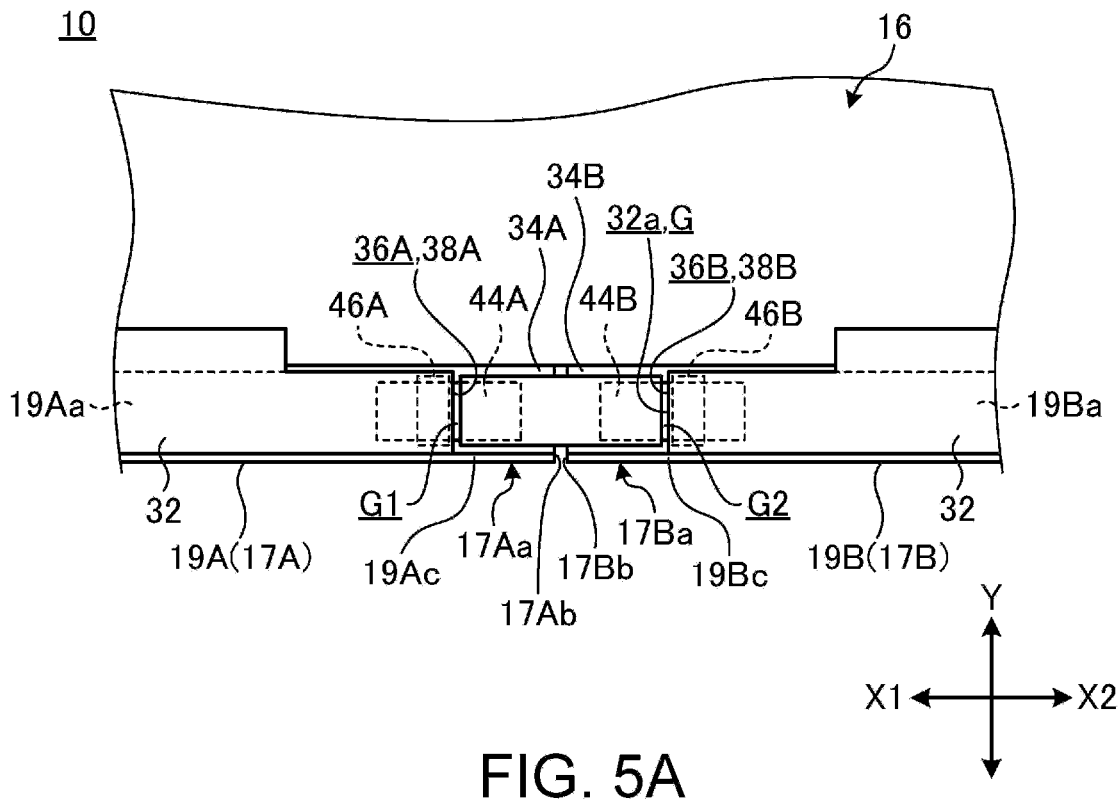
FIG. 5A is a schematic plan view of a cover component illustrated in FIG. 4 and a periphery portion of the cover component.

FIG. 4 is a schematic cross-sectional perspective view along line A-A in FIG. 3. FIG. 5A is a schematic plan view of the cover component 40 illustrated in FIG. 4 and a periphery portion of the cover component.

As illustrated in FIG. 4, the relief shapes of the chassis 12A and 12B are primarily configured by thin bottom plates 34A and 34B formed on the edge portions 17Aa and 17Ba of the chassis members 17A and 17B. The bottom plates 34A and 34B extend over most of the edge portions 17Aa and 17Ba except for both end portions in the Y direction. Each of the bottom plates 34A and 34B is a single plate that is narrow in the X direction and long in the Y direction. End surfaces 17Ab and 17Bb of the edge portions 17Aa and 17Ba are end surfaces of the bottom plates 34A and 34B. As a result, the chassis members 17A and 17B secure an accommodation space for the hinge device 14 inside thereof while preventing the edge portions 17Aa and 17Ba from interfering with each other in a case of the rotational movement.

The relief shapes of the chassis 12A and 12B are secondly configured by notch-shaped portions 36A and 36B formed at both end portions in the Y direction of the edge portions 17Aa and 17Ba of the chassis members 17A and 17B. The notch-shaped portion 36A has a shape in which the front surface 19Aa of the side wall 19A is notched so as to retreat from the end surface 17Ab in the X1 direction. An X2 side end surface of the notch-shaped portion 36A forms a standing wall 38A standing upright in the Z1 direction from the bottom plate 34A. Similarly, the notch-shaped portion 36B has a shape in which the front surface 19Ba of the side wall 19B is notched so as to retreat from the end surface 17Bb in the X2 direction, and is formed with a standing wall 38B on an X1 side end surface. The bottom plates 34A and 34B protrude in the X2 direction or the X1 direction, respectively, from the bottom portions of the standing walls 38A and 38B.

Thus, the front surfaces 19Aa and 19Ba of the side walls 19A and 19B are discontinued at the notch-shaped portions 36A and 36B. For this reason, the bezel member 32 is provided with the dividing portion 32a at the part.

As illustrated in FIG. 5A, the notch-shaped portions 36A and 36B are not formed in thin outer wall plates 19Ac and 19Bc that form outer surfaces of the side walls 19A and 19B. For this reason, when the electronic apparatus 10 is viewed from the side in a case of the 180-degree posture, the notch-shaped portions 36A and 36B are not exposed externally.

As illustrated in FIGS. 4 and 5A, the chassis members 17A and 17B are provided with the notch-shaped portions 36A and 36B on the side walls 19A and 19B. At this time, the notch-shaped portions 36A and 36 have a large gap G between the standing walls 38A and 38B. Therefore, the electronic apparatus 10 of one or more embodiments includes cover components 40 that fills the gap G. The cover components 40 are disposed in the gap G provided at both ends in the Y direction (see FIGS. 2 and 3).

The cover component 40 of one or more embodiments is part of the rear cover component 26. The cover components 40 are respectively formed at both end portions of the rear cover component 26 in the Y direction, and stand upright in the Z direction on the sides of the hinge main body 20. The cover component 40 has, for example, a semi-cylindrical shape when viewed from the side. The cover component 40 may be a separate component from the rear cover component 26. In this case, the cover component 40 may be attached to the rear cover component 26 or the hinge main body 20.

In the 180-degree posture illustrated in FIGS. 4 and 5A, the cover component 40 stands upright between the standing walls 38A and 38B, and fills most of the gap G. However, it is necessary that the cover component 40 is capable of relatively moving with respect to the chassis 12A and 12B. For this reason, the electronic apparatus 10 has respective minute gaps G1 and G2 between the cover component 40 and the end surfaces of the standing walls 38A and 38B and the dividing portion 32a of the bezel member 32 in the 180-degree posture.

Figure 5B:
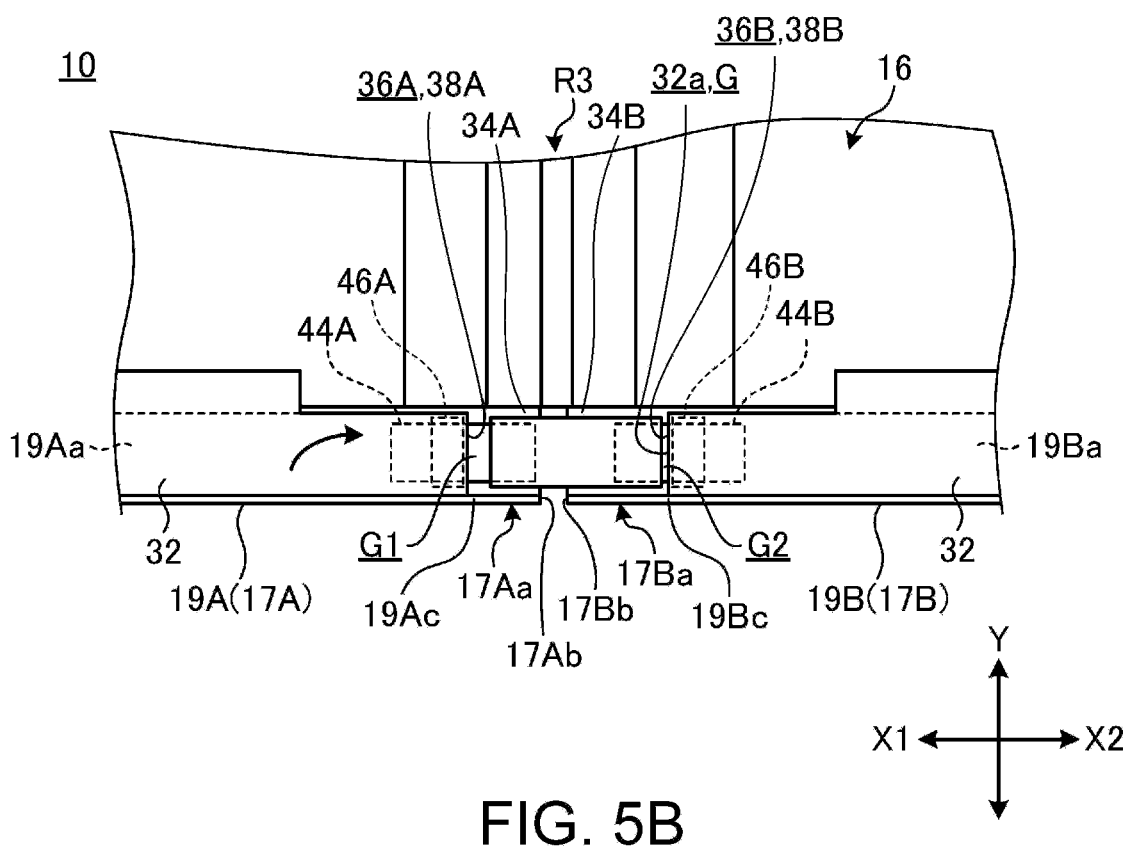
FIG. 5B is a schematic plan view illustrating a state in which the chassis are rotated from the 180-degree posture illustrated in FIG. 5A toward a 0-degree posture.
Figure 6A:
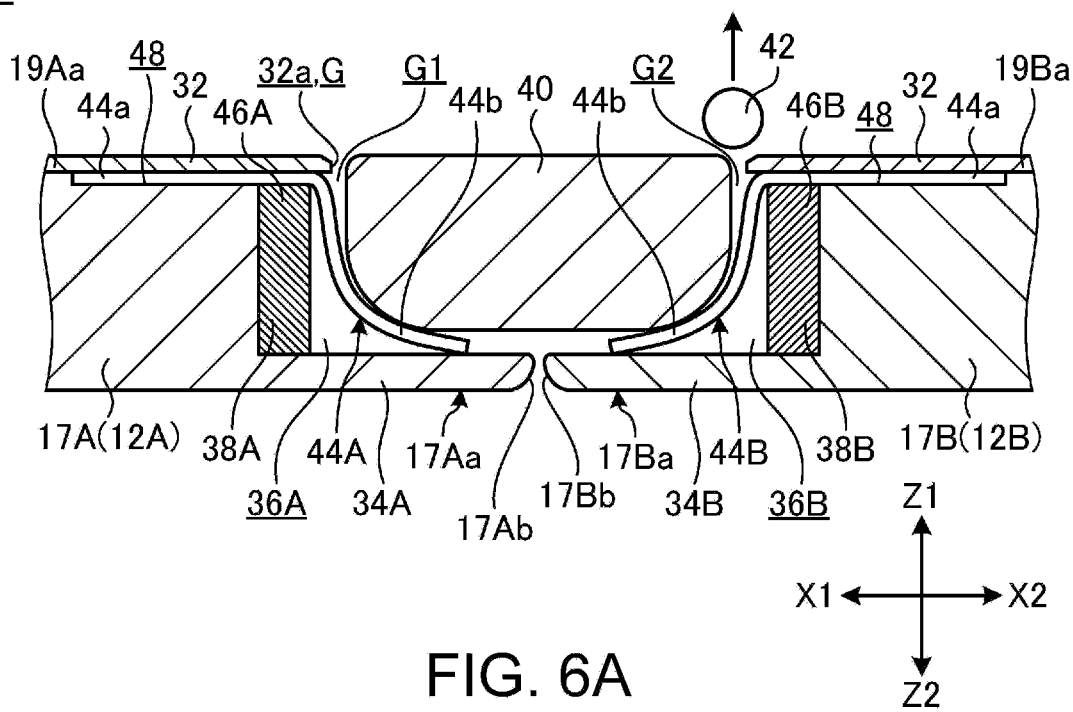
FIG. 6A is a schematic side cross-sectional view along line A-A in FIG. 3.
Figure 6B:
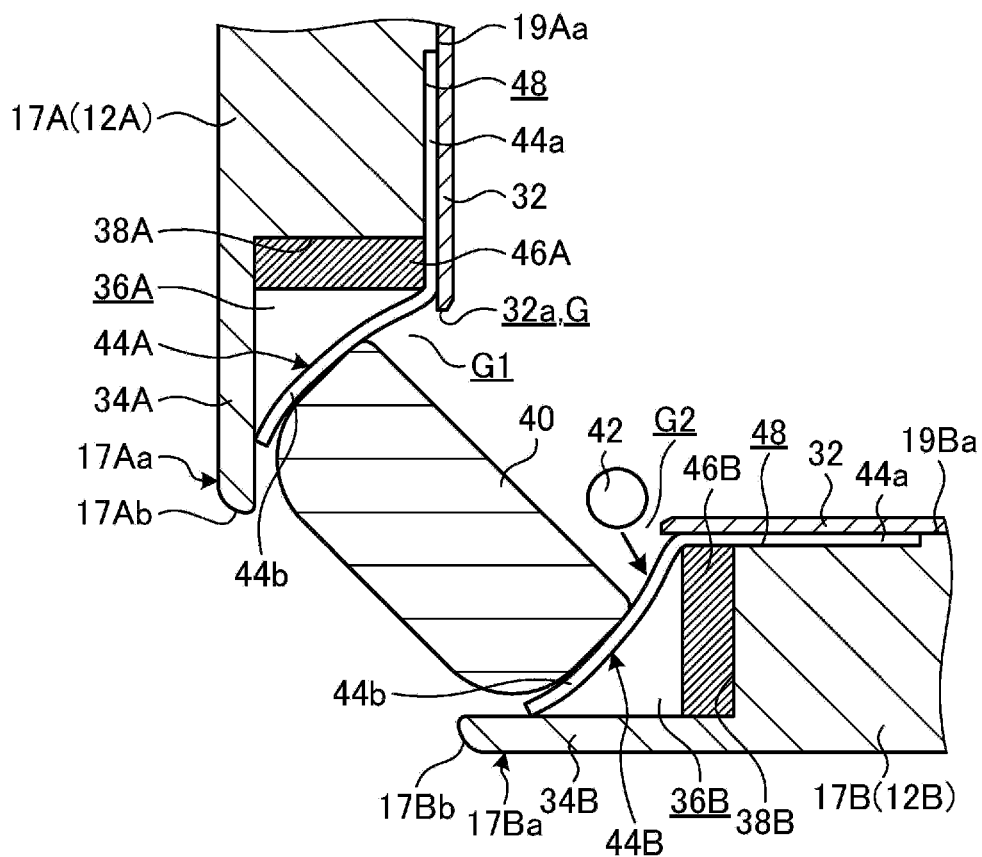
FIG. 6B is a side cross-sectional view in a state in which the chassis illustrated in FIG. 6A is changed to a 90-degree posture.
Figure 6C:
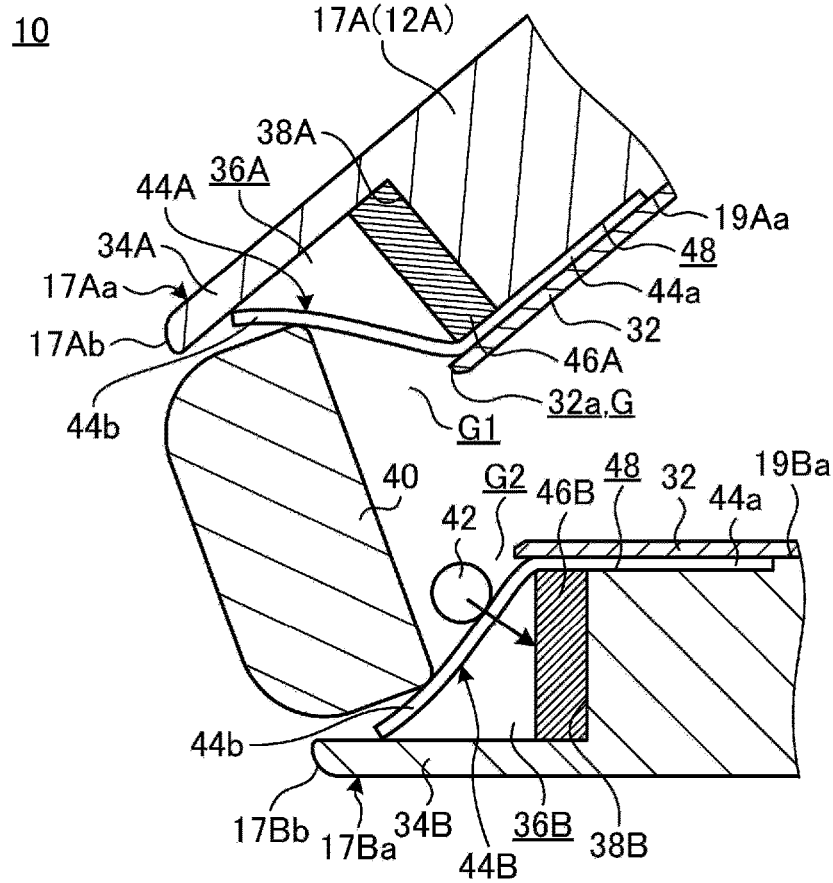
FIG. 6C is a side cross-sectional view in a state in which the chassis illustrated in FIG. 6A is changed to a 40-degree posture.
Figure 6D:
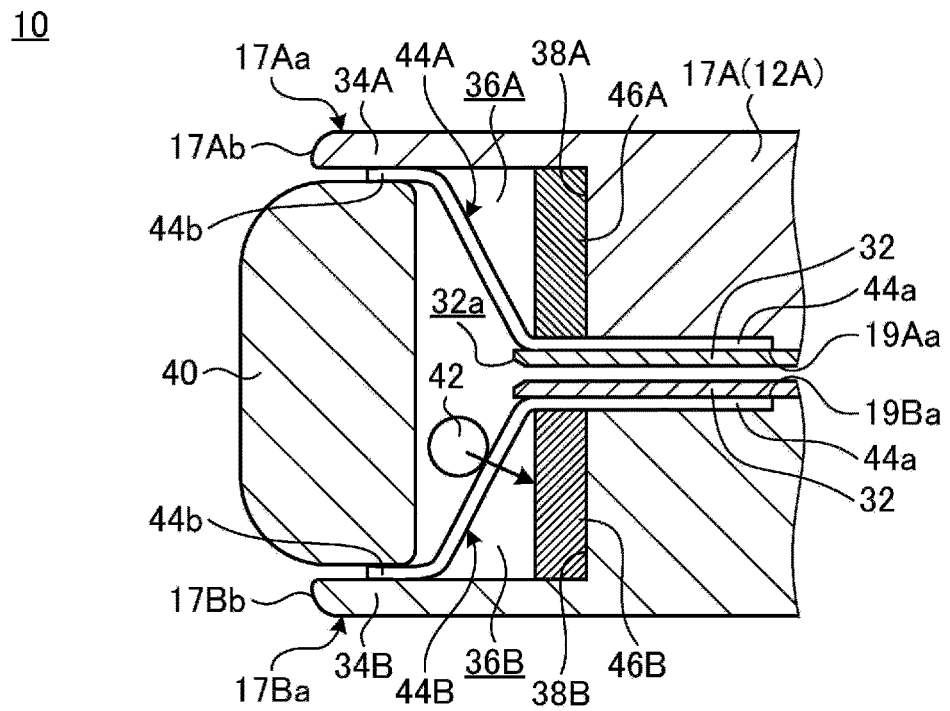
FIG. 6D is a side cross-sectional view in a state in which the chassis illustrated in FIG. 6A is changed to the 0-degree posture.

FIG. 5B is a schematic plan view illustrating a state in which the chassis 12A and 12B are rotated from the 180-degree posture illustrated in FIG. 5A toward the 0-degree posture. FIG. 6A is a schematic side cross-sectional view along line A-A in FIG. 3. FIGS. 6B, 6C, and 6D respectively illustrate states in which the chassis 12A and 12B illustrated in FIG. 6A are changed to the 90-degree posture, the 40-degree posture, and the 0-degree posture.

As illustrated in FIGS. 5A to 6D, when the chassis 12A and 12B rotate from the 180-degree posture toward the 0-degree posture, the cover component 40 relatively moves so as to be separated from the chassis members 17A and 17B. For this reason, the gaps G1 and G2 are gradually enlarged. The gaps G1 and G2 are minute in the 180-degree posture, and are hidden inside the chassis members 17A and 17B in the 0-degree posture. However, for example, in an angular range of 160 to 30 degrees, the gaps are exposed to the outside in a state of being enlarged more than in the case of the 180-degree posture.

For this reason, as illustrated in FIGS. 6B and 6C, foreign matter 42 may enter the enlarged gaps G1 and G2. Examples of the foreign matter 42 include non-metal objects, such as garbage and paper scraps, and metal objects such as screws, clips, and staples. When the foreign matter 42 enters the gaps G1 and G2, there is a concern that the foreign matter 42 enters the insides of the chassis 12A and 12B through the gap between the rear surface of the display 16 and the hinge device 14.

Therefore, in order to suppress the entry of the foreign matter 42 from the gaps G1 and G2, the electronic apparatus 10 of one or more embodiments includes a first gap cover 44A, a second gap cover 44B, a first magnet 46A, and a second magnet 46B. Although one or more embodiments include both the gap covers 44A and 44B and the magnets 46A and 46B, a configuration in which only one of the gap covers and the magnets may be provided.

First, the gap covers 44A and 44B may be formed of a plastic sheet having a certain degree of tension and flexibility. Examples of materials of the gap covers 44A and 44B include polycarbonate (PC) and polyethylene terephthalate (PET). The thickness of the gap covers 44A and 44B is, for example, 0.2 to 0.4 mm.

The first gap cover 44A has a first end portion 44a fixed to the first chassis member 17A, and a front surface of a second end portion 44b comes into contact with an outer peripheral surface of the cover component 40. The first end portion 44a of the first gap cover 44A is fixed to the front surface 19Aa of the side wall 19A with an adhesive material, such as double-sided tape, at an upper portion beyond the standing wall 38A. The second gap cover 44B has a first end portion 44a fixed to the second chassis member 17B, and a front surface of the second end portion 44b comes into contact with an outer peripheral surface of the hinge main body 20. The first end portion 44a of the second gap cover 44B is also fixed to the front surface 19Ba of the side wall 19B with an adhesive material, such as double-sided tape, at an upper portion beyond the standing wall 38B.

In configuration examples illustrated in FIGS. 6A to 6D, the chassis members 17A and 17B have recessed portions 48 on front surfaces 19Aa and 19Ba of the side walls 19A and 19B. The recessed portions 48 are parts where the end portions of the front surfaces 19Aa and 19Ba on the sides of the standing walls 38A and 38B are lowered by one step. The first end portions 44a of the gap covers 44A and 44B are fixed to the bottom surfaces of the recessed portions 48. The recessed portions 48 have a depth corresponding to the thickness of the gap covers 44A and 44B, and are provided to prevent the bezel member 32 from generating a step corresponding to the thickness of the gap covers 44A and 44B. However, since the thickness of the gap covers 44A and 44B is extremely thin, there is almost no effect on the step of the bezel member 32, so that the recessed portions 48 may be omitted.

The gap covers 44A and 44B are provided with some folding tendency at parts that pass through the upper ends of the standing walls 38A and 38B. The folding tendency is in a direction from the upper ends of the standing walls 38A and 38B toward the bottom plates 34A and 34B. As a result, the second end portions 44b of the gap covers 44A and 44B come into contact with the front surface of the cover component 40, and wrap around the lower surface side of the cover component 40 to some extent and are locked. That is, the gap covers 44A and 44B protrude in a direction that gradually inclines toward the bottom plates 34A and 34B toward the direction separated from the upper ends of the standing walls 38A and 38B, and come into contact with the front surface of the cover component 40. For this reason, the second end portions 44b of the gap covers 44A and 44B and the periphery portions of the second end portions 44b have a curved shape along the front surface of the cover component 40.

The gap covers 44A and 44B have Y direction widths that are substantially the same as Y direction widths of the bezel member 32 and the front surfaces 19Aa and 19Ba of the side walls 19A and 19B. In one or more embodiments, the gap covers 44A and 44B may have lengths that are capable of coming into contact with the cover component 40 from the upper end portions of the standing walls 38A and 38B.

As a result, as illustrated in FIGS. 6A to 6C, when the chassis 12A and 12B rotate from the 180-degree posture toward the 0-degree posture, the gap covers 44A and 44B are capable of physically preventing entry of the foreign matter 42 from the enlarging gaps G1 and G2. Specifically, the second end portions 44b of the gap covers 44A and 44B slide on the outer peripheral surface of the hinge main body 20 when the chassis 12A and 12B rotate. For this reason, the gap covers 44A and 44B are always in a state of being spanned from the upper portions of the standing walls 38A and 38B to the cover components 40 regardless of the angular posture between the chassis 12A and 12B, and always close the gaps G1 and G2.

For this reason, even when the foreign matter 42 falls from the gap G2 in the case of the 90-degree posture illustrated in FIG. 6B, the foreign matters 42 hit the front surface of the second gap cover 44B and are prevented from falling further. As a result, it is possible to suppress the foreign matter 42 from entering the inside of the second chassis 12B through the gap G2, and the same effect is exhibited for the first gap cover 44A.

In one or more embodiments, the gap covers 44A and 44B are plastic sheets. A plastic sheet has advantages of easily generating a reaction force toward the side of the cover component 40 and of easily reducing sliding resistance with respect to the cover component 40. For this reason, even when the chassis 12A and 12B are repeatedly rotated between the 180-degree posture and the 0-degree posture, the gap covers 44A and 44B, which are configured by plastic sheets, are capable of smoothly returning to the initial posture illustrated in FIG. 6A whenever becoming the 180-degree posture.

Next, the first magnet 46A is fixed to the inner surfaces of the standing wall 38A and the bottom plate 34A, and is installed so that an attraction surface faces the first gap G1. Similarly, the second magnet 46B is fixed to the inner surfaces of the standing wall 38B and the bottom plate 34B, and is installed so that an attraction surface faces the second gap G2.

As a result, as illustrated in FIGS. 6A to 6C, when the chassis 12A and 12B are rotated from the 180-degree posture toward the 0-degree posture, the magnets 46A and 46B are capable of adsorbing metallic foreign matter 42 that enters through the enlarging gaps G1 and G2. As a result, it is possible to suppress the foreign matter 42 from entering the insides of the chassis 12A and 12B through the gaps G1 and G2.

In one or more embodiments, the gap covers 44A and 44B are used together with the magnets 46A and 46B. For this reason, as illustrated in FIGS. 6B and 6C, for example, the metallic foreign matter 42 that has entered the gap G2 further receive attraction force of the magnets 46A and 46B in a state of being caught on the front surfaces of the gap covers 44A and 44B. Here, the gap covers 44A and 44B have the hinge device 14 on sides opposite to the outer wall plates 19Ac and 19Bc. For this reason, the gap covers 44A and 44B are not capable of covering the sides, and a possibility that the foreign matter 42 caught on the gap covers 44A and 44B falls into the insides of the chassis 12A and 12B from the sides is not zero. At this point, in one or more embodiments, both the gap covers 44A and 44B and the magnets 46A and 46B are used, thereby suppressing the metallic foreign matter 42 from entering the insides of the chassis 12A and 12B and generating a serious problems such as an electrical short.

As described above, one or more embodiments may include both the gap covers 44A and 44B and the magnets 46A and 46B. However, as described above, a configuration in which only one of the gap covers and the magnets may be provided. That is, in a configuration in which only the gap covers 44A and 44B are included, it is possible to physically suppress the entry from the gaps G1 and G2 regardless of the material of the foreign matter 42. In addition, in a configuration in which only the magnets 46A and 46B are included, it is possible to suppress the metallic foreign matter 42, which is particularly desired to be prevented from entering the insides of the chassis 12A and 12B, from entering the insides of the chassis 12A and 12B through the gaps G1 and G2 by magnetic force.

Here, in the electronic apparatus 10 of one or more embodiments, the bezel member 32 surrounding the outer periphery of the display 16 is divided by the gap G. In other words, the bezel member 32 has the dividing portion 32a at a position where overlaps the gap G. For this reason, the bezel member 32 does not generate deformation or the like due to rotation between the chassis 12A and 12B, and occurrence of peeling and twisting is prevented. On the other hand, since the bezel member 32 has the dividing portion 32a, the large gap G at the side portion of the display 16 of the electronic apparatus 10 appears as it is in the appearance. Therefore, the electronic apparatus 10 fills the gap G with the cover component 40, and suppresses the entry of the foreign matter 42 from the gaps G1 and G2 between the cover component 40 and the chassis members 17A and 17B using the gap covers 44A and 44B and the magnets 46A and 46B, thereby ensuring an effect of preventing the entry of the foreign matter while improving the appearance quality.

The present invention is not limited to the above-described embodiments, and modification is freely possible without departing from the gist of the present invention.

In the above, the electronic apparatus 10 that is capable of being folded in half like a book is exemplified. It is possible to apply the present invention to, in addition to a configuration of folding the same-shaped chassis in half, for example, various configurations, such as a double-door configuration in which small chassis are foldably connected to the left and right edge portions of a large chassis, a configuration, an S-shaped folding configuration in which chassis with different folding directions are connected to the left and right edge portions of one chassis, and a J-shaped folding configuration in which a small chassis is foldably connected to one of the left and right edge portions of a large chassis, and the number of chassis to be connected may be four or more.

DESCRIPTION OF SYMBOLS 10 electronic apparatus
12A first chassis
12B second chassis
14 hinge device
16 display
17A first housing member
17B second housing member
32 bezel member
36A, 36B notch-shaped portion
38A, 38B standing wall
40 cover component
44A first gap cover
44B second gap cover
46A first magnet
46B second magnet

What is claimed is:

1. An electronic apparatus comprising:
a first chassis member that has a first edge portion;
a second chassis member that has a second edge portion adjacent to the first edge portion, and is adjacent to the first chassis member;
a hinge device that connects the first chassis member and the second chassis member so as to be relatively rotatable between a first posture in which the first chassis member and the second chassis member are stacked so as to overlap each other in a surface normal direction and a second posture in which the first chassis member and the second chassis member are aligned in a direction perpendicular to the surface normal direction;
a cover component that is disposed so as to straddle the first edge portion and the second edge portion, and disposed so as to fill a gap formed between front surfaces of the first chassis member and the second chassis member in a case of the second posture;
a first gap cover that is interposed in a first gap formed between the cover component and the first chassis member; and
a second gap cover that is interposed in a second gap formed between the cover component and the second chassis member, wherein
the first gap cover is a plastic sheet that is fixed to the first chassis member and protrudes from the first chassis member toward the cover component,
the second gap cover is a plastic sheet that is fixed to the second chassis member and protrudes from the second chassis member toward the cover component,
the first edge portion is provided with a first standing wall that stands upright toward a front surface of the first chassis member and a first bottom plate that protrudes from a bottom portion of the first standing wall toward a side of the second edge portion,
the second edge portion is provided with a second standing wall that stands upright toward a front surface of the second chassis member and a second bottom plate that protrudes from a bottom portion of the second standing wall toward a side of the first edge portion,
the first gap cover is fixed to the first chassis member at an upper portion of the first standing wall and protrudes in a direction gradually inclined to a side of the first bottom plate in a direction separated from the first standing wall, and
the second gap cover is fixed to the second chassis member at an upper portion of the second standing wall and protrudes in a direction gradually inclined to a side of the second bottom plate in a direction separated from the second standing wall.

2. The electronic apparatus according to claim 1, wherein the first gap cover comes into contact with the cover component so as to be relatively movable, and the second gap cover comes into contact with the cover component so as to be relatively movable.

3. The electronic apparatus according to claim 1, further comprising:

a first magnet that is fixed to the first chassis member and faces the first gap; and a second magnet that is fixed to the second chassis member and faces the second gap.

4. The electronic apparatus according to claim 1, further comprising:

a display that is provided between the first chassis member and the second chassis member, and has a folding region which is folded according to relative rotation of the first chassis member and the second chassis member; and a bezel member that surrounds an outer periphery of the display, wherein the cover component is disposed so as to be adjacent to an outer portion of the display, and the bezel member is divided by the gap.

5. An electronic apparatus comprising:

a first chassis member that has a first edge portion provided with a first standing wall that stands upright toward a front surface of the first chassis member;

a second chassis member that has a second edge portion provided with a second standing wall that stands upright toward a front surface of the second chassis member, where the second edge portion is adjacent to the first edge portion, and the second chassis member is adjacent to the first chassis member;

a hinge device that connects the first chassis member and the second chassis member so as to be relatively rotatable between a first posture in which the first chassis member and the second chassis member are stacked so as to overlap each other in a surface normal direction and a second posture in which the first chassis member and the second chassis member are aligned in a direction perpendicular to the surface normal direction;

a cover component that is disposed so as to straddle the first edge portion and the second edge portion, and disposed so as to fill a gap formed between front surfaces of the first chassis member and the second chassis member in a case of the second posture;

a first magnet that is fixed to an inner surface of the first standing wall such that an attraction surface of the first magnet faces a first gap formed between the cover component and the first chassis member; and a second magnet that is fixed to an inner surface of the second standing wall such that an attraction surface of the second magnet faces a second gap formed between the cover component and the second chassis member.

6. The electronic apparatus according to claim 5, further comprising:

a first gap cover that is fixed to the first chassis member and interposed in the first gap; and a second gap cover that is fixed to the second chassis member and interposed in the second gap.

\* \* \* \* \*